(12) United States Patent
Newman et al.

(10) Patent No.: US 8,424,389 B2
(45) Date of Patent: Apr. 23, 2013

(54) ANNULAR BOURDON TUBE GAUGE ASSEMBLY

(75) Inventors: Shmuel Dovid Newman, Redondo Beach, CA (US); Jeffrey O. Brown, North Logan, UT (US)

(73) Assignee: YSN Imports, Inc., Gardena, CA (US)

( * ) Notice: Subject to any disclaimer, the term of this patent is extended or adjusted under 35 U.S.C. 154(b) by 431 days.

(21) Appl. No.: 12/849,687

(22) Filed: Aug. 3, 2010

(65) Prior Publication Data

US 2011/0030480 A1 Feb. 10, 2011

Related U.S. Application Data

(60) Provisional application No. 61/231,309, filed on Aug. 4, 2009.

(51) Int. Cl.
*G01L 7/04* (2006.01)
(52) U.S. Cl.
USPC .......................................................... 73/741
(58) Field of Classification Search .................. None
See application file for complete search history.

(56) References Cited

U.S. PATENT DOCUMENTS

| | | | | |
|---|---|---|---|---|
| 4,542,654 A * | 9/1985 | Wilson et al. | ................... | 73/741 |
| 4,773,271 A * | 9/1988 | Mutou et al. | ................... | 73/741 |
| 5,581,029 A * | 12/1996 | Wahl et al. | ................... | 73/741 |
| 5,785,050 A | 7/1998 | Davidson et al. | | |
| 5,796,008 A * | 8/1998 | Stoll et al. | ................... | 73/740 |
| 6,026,854 A | 2/2000 | Davidson | | |
| 6,044,712 A * | 4/2000 | Cannet et al. | ................... | 73/741 |
| 6,082,396 A | 7/2000 | Davidson | | |
| 6,216,541 B1 * | 4/2001 | Carpenter | ................... | 73/741 |
| 6,286,543 B1 | 9/2001 | Davidson | | |
| 6,318,407 B1 * | 11/2001 | Kohn et al. | ................... | 137/557 |
| 6,551,507 B2 * | 4/2003 | Gosling | ................... | 210/232 |
| 6,651,507 B1 | 11/2003 | Hamma et al. | | |
| 6,758,097 B2 | 7/2004 | McSheffrey | | |
| 6,763,725 B1 | 7/2004 | Huang | | |
| 7,040,175 B1 | 5/2006 | Huang | | |
| 7,089,956 B1 | 8/2006 | Davidson et al. | | |
| 7,272,977 B2 * | 9/2007 | Coleman | ................... | 73/736 |
| 7,469,591 B1 | 12/2008 | Chuang | | |
| 2007/0137304 A1 | 6/2007 | Rutherford et al. | | |

OTHER PUBLICATIONS

Flotec, Inc.; Internet advertisement for "Ingage Series Heliox Regulators" (PDF document); The document states Copyright 2009.

* cited by examiner

*Primary Examiner* — Lisa Caputo
*Assistant Examiner* — Jermaine Jenkins
(74) *Attorney, Agent, or Firm* — Lance M. Pritikin, Esq.

(57) ABSTRACT

An annular bourdon tube gauge assembly comprises a bourdon tube member, a first flange element, a second flange element and a pressure level indicator, and is adapted to be mounted externally circumferentially of a portion of a body member that is adapted to confining a pressurized fluid, such as a pressure regulator. The bourdon tube is axially disposed between the first and second flange elements, and has a spiral shape, a radially inner end and a radially outer end. The radially inner end is fixed with respect to the portion of the body member. The radially outer end is free to move circumferentially responsive to changes in the fluid pressure entering a pressure receiving port at the radially inner end. The pressure level indicator is mounted to and moveable with the radially outer end, and is viewable from a position located laterally outward of the first and second flange elements.

19 Claims, 10 Drawing Sheets

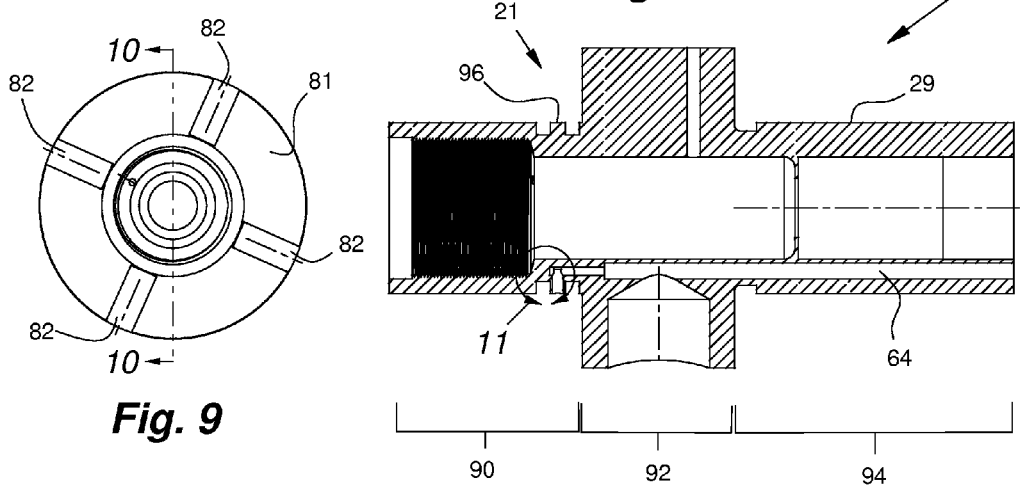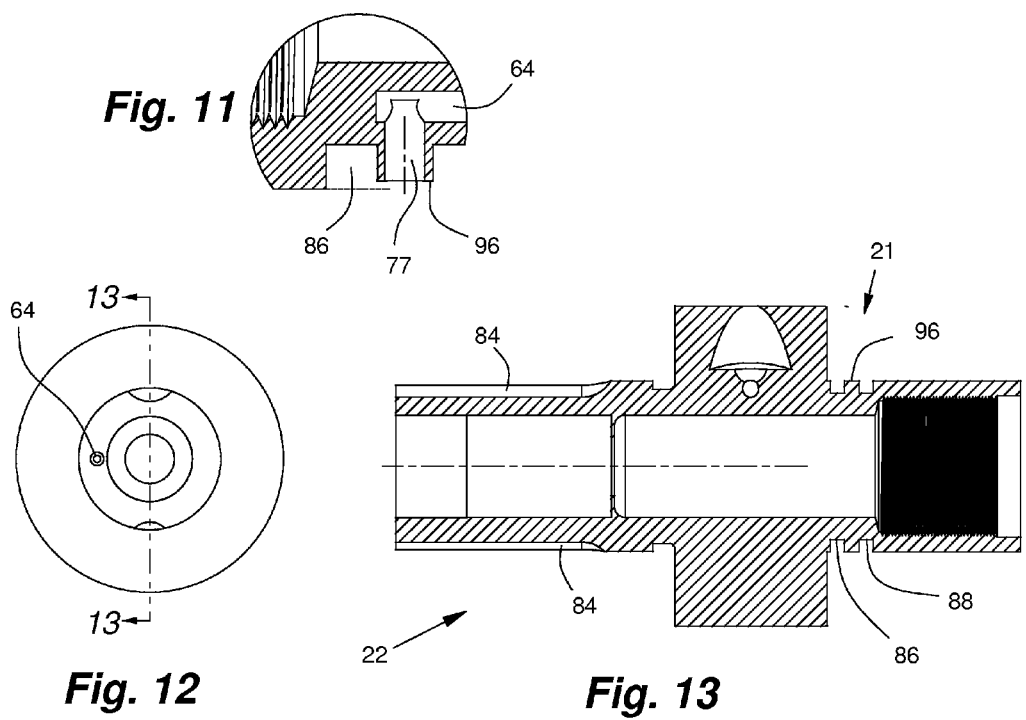

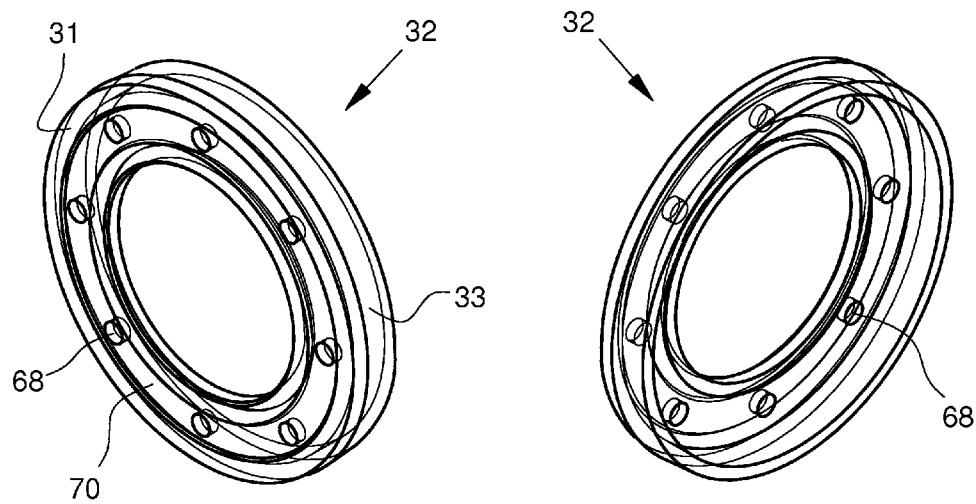
*Fig. 19*     *Fig. 20*
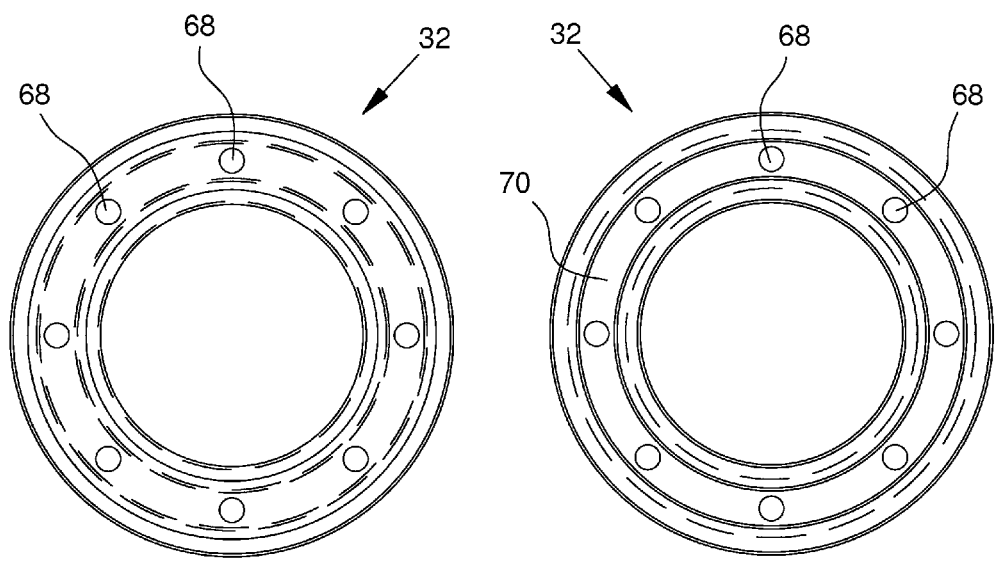
*Fig. 21*     *Fig. 22*

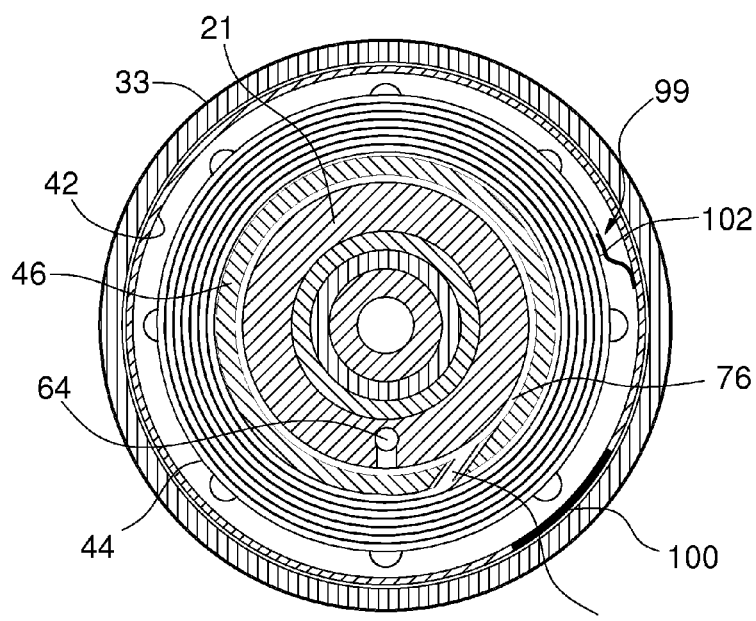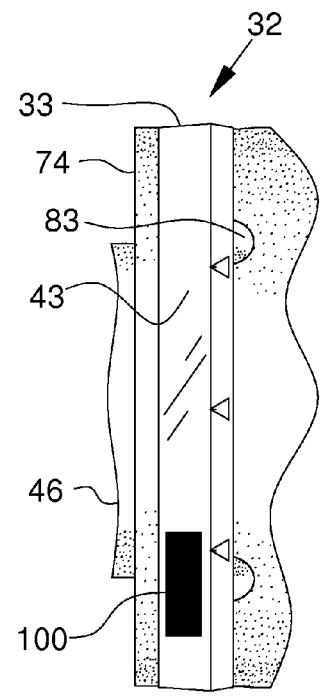
Fig. 23   Fig. 24
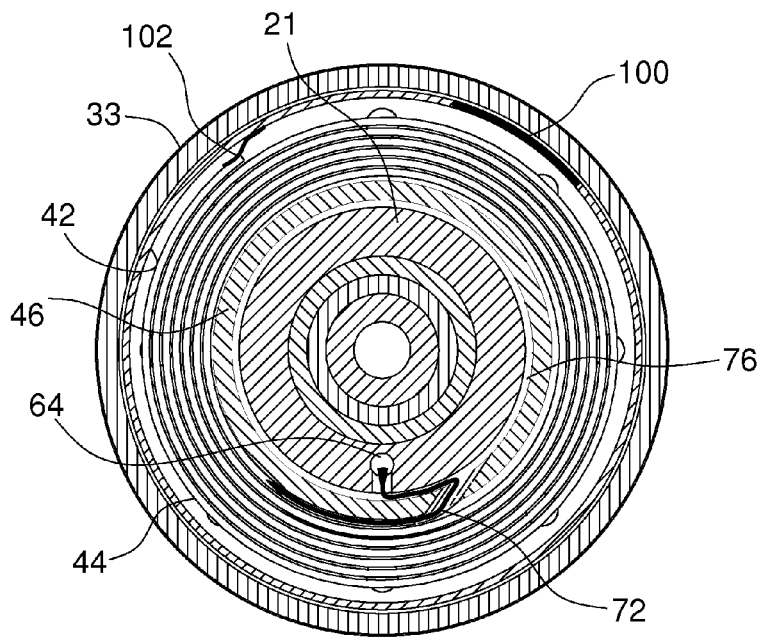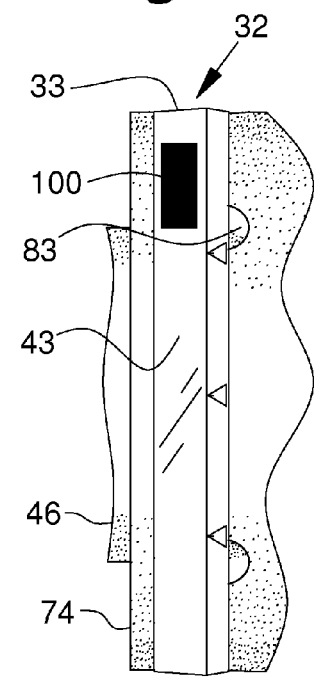
Fig. 25   Fig. 26

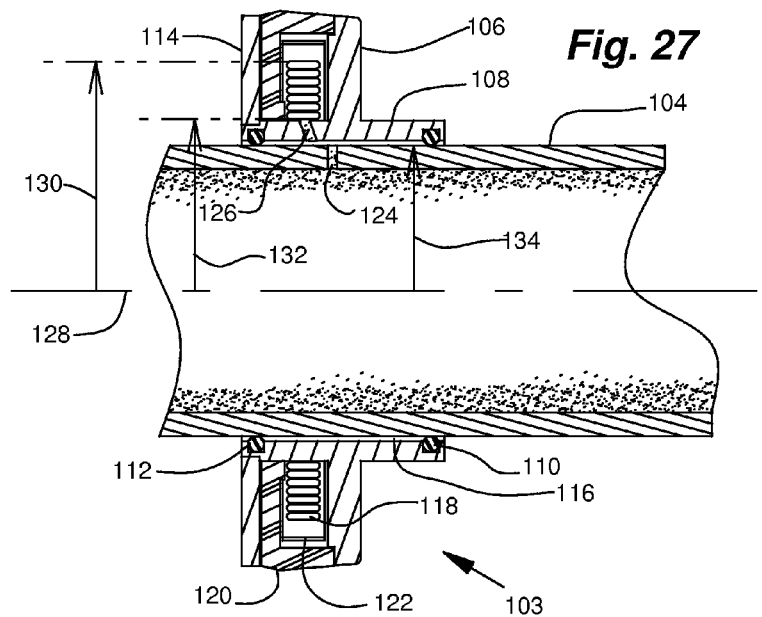
*Fig. 27*
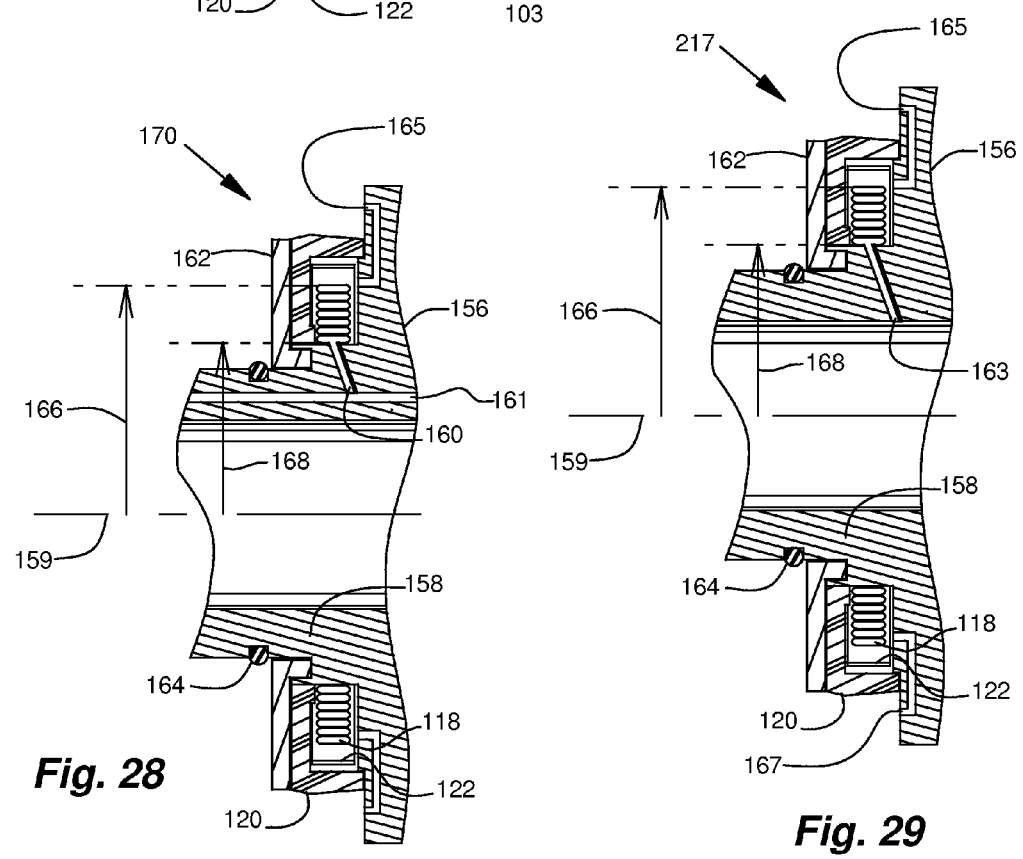
*Fig. 28*
*Fig. 29*

ANNULAR BOURDON TUBE GAUGE ASSEMBLY

RELATED APPLICATIONS

This application claims the benefit of U.S. Provisional Application No. 61/231,309 filed Aug. 4, 2009, the content of which is incorporated by this reference in its entirety for all purposes as if fully set forth herein.

TECHNICAL FIELD

The present invention relates generally to the field of pressure gauges. More particularly, the invention concerns a compact, rugged, side-readable bourdon tube pressure gauge. Further, the invention concerns a compact, rugged, side-readable bourdon tube pressure gauge which is used in conjunction with a pressure regulator apparatus.

BACKGROUND OF THE INVENTION

Pressure gauges are employed in a variety of pressurized fluid systems to allow the operator to quickly determine the pressure of the system at a particular location and to identify potentially dangerous over or under-pressurization conditions within the system. In systems that rely on limited-capacity tanks as a source of pressurized fluid, pressure gauges also allow the operator to continuously monitor the amount of pressurized fluid remaining in the system.

Bourdon tube pressure gauges are commonly used to measure pressure in pressurized fluid systems. A bourdon tube pressure gauge uses a coiled tube with an open end and a closed end. The open end is connected to a source of pressurized fluid. The coiled tube tends to increasingly uncoil as fluid of higher pressure enters the open end.

The readable portion of a bourdon tube gauge typically resembles a traditional clock, comprising a flat, disk-like dial face, and a rotating radial pointer. Conventional bourdon tube gauges generally employ internal gearing to exaggerate the movement of the bourdon tube within the gauge housing. Huang U.S. Pat. No. 6,763,725 and U.S. Pat. No. 7,040,175 disclose a pressure reading structure used in a pressure gauge in which the user is enabled to view the readings of the pressure gauge through a transparent housing from the peripheral side of the gauge.

In hand-held or other pressurized systems where a pressure gauge is likely to encounter objects that are moving relative to the gauge, it is particularly important to minimize the gauge's profile and make it as rugged as possible so as to prevent damage, for example, to the gauge, the surrounding environment, the operator, or the pressurized system itself. In hand-held and other pressurized systems, it may also be particularly useful for an operator to be able to view the pressure gauge from a variety of angles lateral to the structure to which the gauge is mounted.

There exists a need for an improved fluid pressure gauge that solves at least these problems, and provides advantages which will become apparent to those skilled in the art upon reading this disclosure.

SUMMARY OF THE INVENTION

The annular bourdon tube gauge assembly of the present invention is applicable to a wide number of situations in which it is desired or required to read pressure values from a location positioned laterally of the structure to which the gauge assembly is mounted.

According to certain embodiments, the annular bourdon tube gauge assembly comprises a first and second flange element, a bourdon tube member, a pressure level indicator, and an adaptation allowing it to be mounted generally externally circumferentially of a portion of a body member that is adapted to confining a pressurized fluid. In some embodiments, this portion forms part of the housing of a fluid pressure regulator system.

The first and second flange elements are adapted to receive or otherwise engage the portion and to extend approximately radially outwardly therefrom. In some embodiments, the first flange element is integral with the body member.

The bourdon tube member has a generally spiral shape featuring a generally circular central opening therein. The generally circular central opening is adapted to receive the portion of the body member therethrough. The bourdon tube member further has a radially inner end, a radially outer end and a fluid pressure receiving port. The radially inner end is adapted to being generally spatially fixed with respect to the portion of the body member. The radially outer end is generally free to move generally circumferentially of said bourdon tube member responsive to changes in the fluid pressure. The fluid pressure receiving port is adapted to being placed in fluid communication with the pressurized fluid. The bourdon tube member is generally axially disposed between the first and second flange elements.

The pressure level indicator is mounted to and moveable with the radially outer end of the bourdon tube. The pressure level indicator is disposed between the first and second flange elements and is viewable from a position located approximately laterally outward of the first and second flange elements. Embodiments may further comprise a window element having a display portion being substantially transparent and disposed between the pressure level indicator and the position. The pressure level indicator may include a gauge face having pressure indicating markings thereon and extending in a generally circumferential direction between the display portion and the bourdon tube member.

Safety considerations result in providing pressurized fluid vent structures in certain embodiments, which, in the event the bourdon tube ruptures, discharge pressurized fluid in a diffused generally safe pattern. Safety considerations according to certain embodiments provide rugged flanges that protect the pressure sensing and viewing members of the gauge assembly from accidental damage due to rough handling or harsh environments. Safety and convenience according to certain embodiments occasion the provision of several pressure viewing locations, generally located circumferentially of the generally annular bourdon tube gauge assembly.

BRIEF DESCRIPTION OF THE DRAWINGS

Further advantages of the present invention may become apparent to those skilled in the art with the benefit of the following detailed description of the preferred embodiments and upon reference to the accompanying drawings in which:

FIG. 9 is a diagrammatic front view of the regulator body shown in FIG. 7;

FIG. 10 is a diagrammatic cross-sectional view taken along line 10-10 in FIG. 9;

FIG. 11 is a broken enlarged diagrammatic view of section "11" in FIG. 10;

FIG. 12 is a diagrammatic rear view of the regulator body shown in FIG. 7;

FIG. 13 is a diagrammatic cross-sectional view taken along line 13-13 in FIG. 12;

FIG. 19 is a diagrammatic perspective view of a window element of an embodiment of an annular bourdon tube gauge assembly shown in FIG. 2, with particular attention drawn to the several vent holes and an annular groove which forms a portion of an annular vent manifold when the annular bourdon tube gauge assembly is in its assembled state;

FIG. 20 is a further diagrammatic perspective view of the window element shown in FIG. 19;

FIG. 21 is a diagrammatic back view of the window element shown in FIG. 19;

FIG. 22 is a diagrammatic front view of the window element shown in FIG. 19;

FIG. 23 is a diagrammatic cross-sectional view taken along line 23-23 in FIG. 2, in which the bourdon tube member is unpressurized;

FIG. 24 is a diagrammatic partial side view of an embodiment of an annular bourdon tube gauge assembly in the condition shown in FIG. 23, which results in an unpressurized indication at the window element;

FIG. 25 is a diagrammatic cross-sectional view taken along line 23-23 in FIG. 2, in which the bourdon tube member is pressurized;

FIG. 26 is a diagrammatic partial side view of an embodiment of an annular bourdon tube gauge assembly in the condition shown in FIG. 25, which results in a pressurized indication at the window member;

FIG. 27 is a diagrammatic partial cross-sectional side view of an embodiment of an annular bourdon tube gauge assembly mounted generally externally circumferentially of a portion of a body member in the form of a fluid pressure containing conduit wherein the pressure gauge assembly is slidably and sealingly received on the conduit in operative association with a port in the conduit;

FIG. 28 is a diagrammatic partial cross-sectional side view of an embodiment of an annular bourdon tube gauge assembly mounted generally externally circumferentially of a portion of a body member in the form of a pressure regulator adjacent a tank end of the regulator;

FIG. 29 is a diagrammatic partial cross-sectional side view of an additional embodiment of an annular bourdon tube gauge assembly mounted generally externally circumferentially of a portion f a body member in the form of a pressure regulator adjacent a tank end of the regulator;

Figure 1:
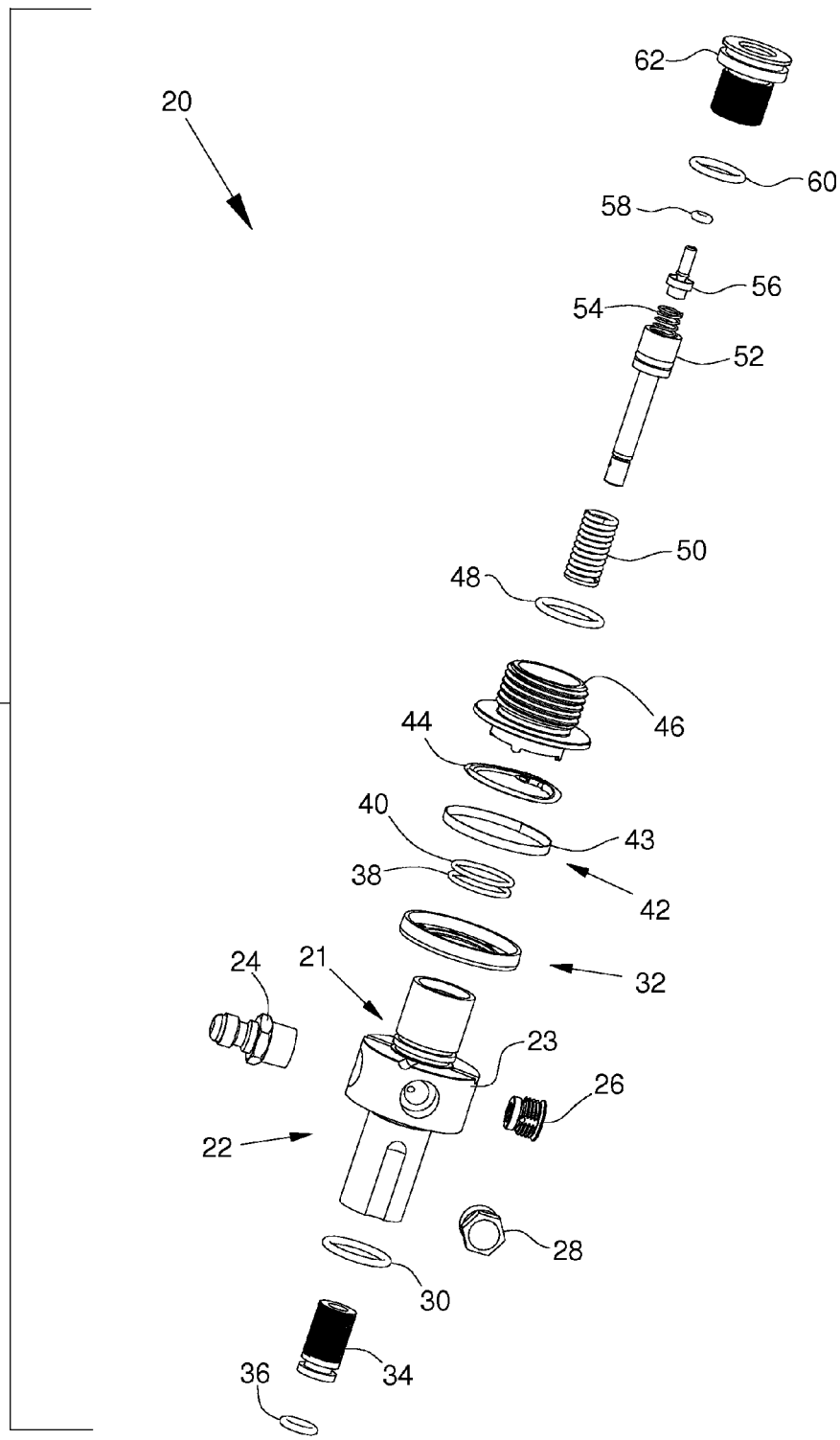
FIG. 1 is a diagrammatic exploded perspective view of an embodiment of an annular bourdon tube gauge assembly.

While the invention is susceptible to various modifications and alternative forms, specific embodiments thereof are shown by way of example in the drawings and may herein be described in detail. The drawings may not be to scale. It should be understood, however, that the drawings and the detailed description thereto are not intended to limit the invention to the particular for disclosed, but to the contrary, the intention is to cover all modifications.

DETAILED DESCRIPTION OF THE PREFERRED EMBODIMENT(S)

Referring now to the drawings, like reference numerals designate identical or corresponding features throughout the several views.

Referring to FIGS. 1-4, one embodiment of an annular bourdon tube gauge assembly is shown generally at 20, and comprises an adaptation allowing the annular bourdon tube gauge assembly 20 to be mounted generally externally circumferentially of a portion 21 of a body member 22 that is adapted to confining a pressurized fluid 72. Embodiment 20 also comprises a first flange element 23, a second flange element 74, a bourdon tube member 44 and a pressure level indicator 42.

The first flange element 23 and second flange element 74 are adapted to receive the portion 21 and to extend approximately radially outwardly therefrom. In certain embodiments, such as the one illustrated in FIG. 4, the first flange element 23 and second flange element 74 are adapted to engage the portion 21 and to extend approximately radially outwardly therefrom. In particular embodiments, such as the one shown generally at 20, the first flange element 23 is integral with the body member 22.

Figure 14:
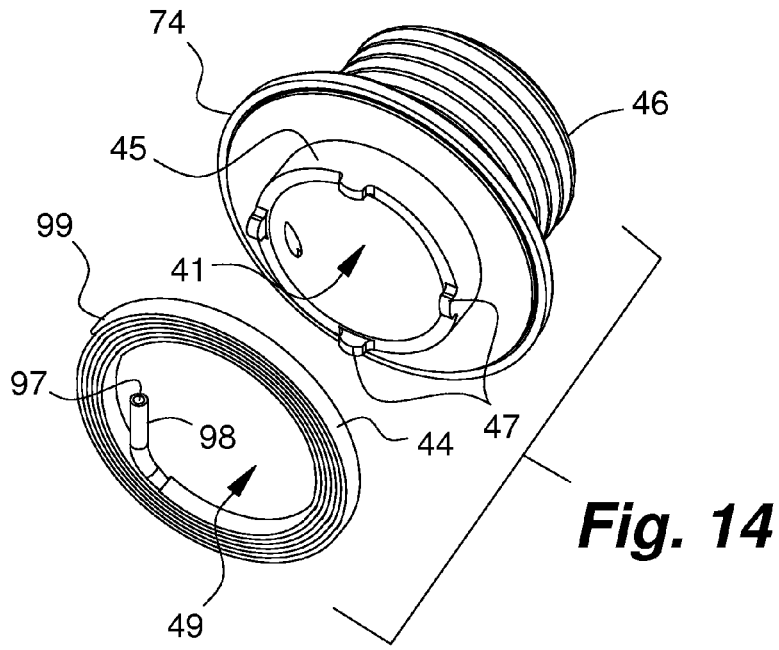
FIG. 14 is a diagrammatic perspective view of a spool member and bourdon tube member prior to their assembly together.
Figure 15:
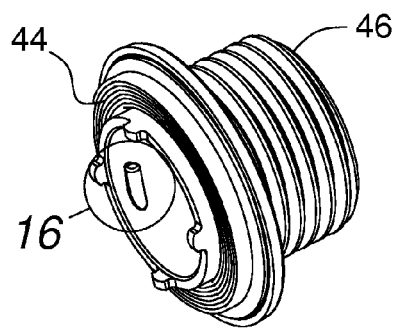
FIG. 15 is a diagrammatic perspective view of a spool member and bourdon tube member after being brought together but before the final assembly operations, with the radially inner end of the bourdon tube member having been inserted through the wall of the spool sleeve.
Figure 17:
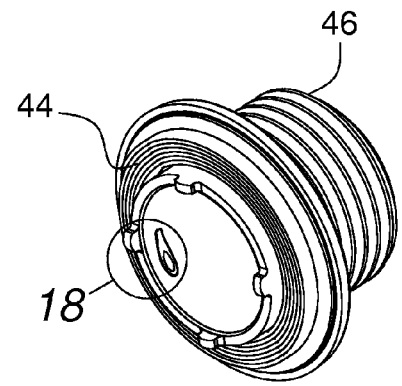
FIG. 17 is a diagrammatic perspective view of a spool member and bourdon tube member after being assembled, with the radially inner end of the bourdon tube member having been inserted through the wall of the spool sleeve, soldered there, and the excess material of the radially inner end of the bourdon tube member having been machined away.
Figure 16:
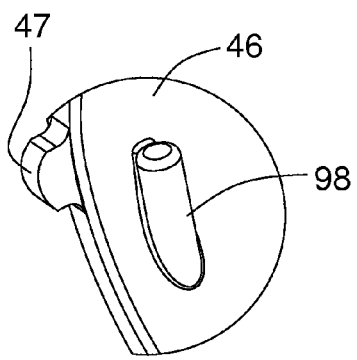
FIG. 16 is a broken enlarged diagrammatic view of section "16" in FIG. 15.
Figure 18:
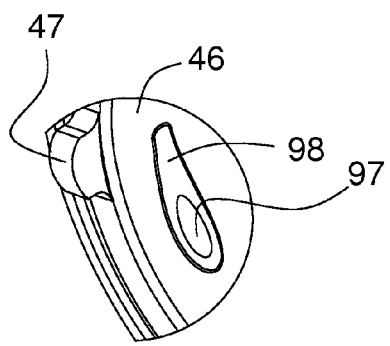
FIG. 18 is a broken enlarged diagrammatic view of section "18" in FIG. 17.

Referring to FIG. 14, the bourdon tube member 44 has a generally spiral shape with a generally circular central opening 49 therein. The generally circular central opening 49 is adapted to receive the portion 21 therethrough. The bourdon tube member 44 further has a radially inner end 98, a radially outer end 99 and a fluid pressure receiving port 97. The radially inner end 98 is adapted to being generally spatially fixed with respect to the portion 21. The radially outer end 99 is generally free to move generally circumferentially of the bourdon tube member 44 responsive to changes in the fluid pressure 72. The fluid pressure receiving port 97 is adapted to be placed in fluid communication with the pressurized fluid 72. The bourdon tube member 44 is generally axially disposed between the first flange element 23 and the second flange element 74.

Referring to FIGS. 23-26, the pressure level indicator 42 is mounted to and moveable with the radially outer end 99, in some embodiments by way of a connection 102. Connection 102 may be, for example, a flexible strip, an appropriate adhesive or an equivalent structure. It is intended that pressure level indicator 42 is considered mounted to the radially outer end 99 even if it is connected to the bourdon tube member 44 at a limited distance from the radially outer end 99. The pressure level indicator 42 is disposed between the first flange element 23 and the second flange element 74, and is viewable from a position located approximately laterally outward of the first flange element 23 and second flange element 74. Depending upon the particular embodiment, the pressure level indicator 42 may be a small visible marking or strip, or it may extend through all or part of a 360-degree arc.

Referring to FIGS. 1-4, in embodiments such as the one shown generally at 20, the portion 21 forms part of the housing of a fluid pressure regulator system. The fluid pressure regulator system may comprise, for example, a body portion 22, a fill attachment 24, pressure relief plugs 26 and 28, an input side retainer member 34, a piston spring 50, a piston member 52, a poppet spring 54, a poppet member 56, a poppet o-ring 58, a discharge side retainer member 62, a fill channel 64, a main axis 80, and o-ring seals 30, 36, 48 and 60. As shown, for example, in FIG. 10, the body member of embodiments may have a proximal portion 90, a medial portion 92 and a distal portion 94. Some or all of the distal portion 94 may feature a threaded surface 29 and one or more pressure relief grooves 84.

Referring to FIGS. 19, 24 and 26 for illustration, embodiments may further comprise a window element 32 having a display portion 33 being substantially transparent and disposed between the pressure level indicator 42 and the position. The pressure level indicator 42 may include a gauge face 43 having pressure indicating markings (as illustrated, for example, at 100) thereon and extending in a generally circumferential direction between the display portion 33 and the bourdon tube member 44. In some embodiments, the pressure level indicator 42 is generally cylindrical and divisible into three display sections, each being defined by a separate 120-degree arc of the pressure level indicator, and each displaying identical pressure level information. Referring to FIGS. 24 and 26, for example, in certain embodiments, the gauge face 43 is substantially cylindrical and substantially visible through the display portion 33 in a radial direction.

Figure 4:
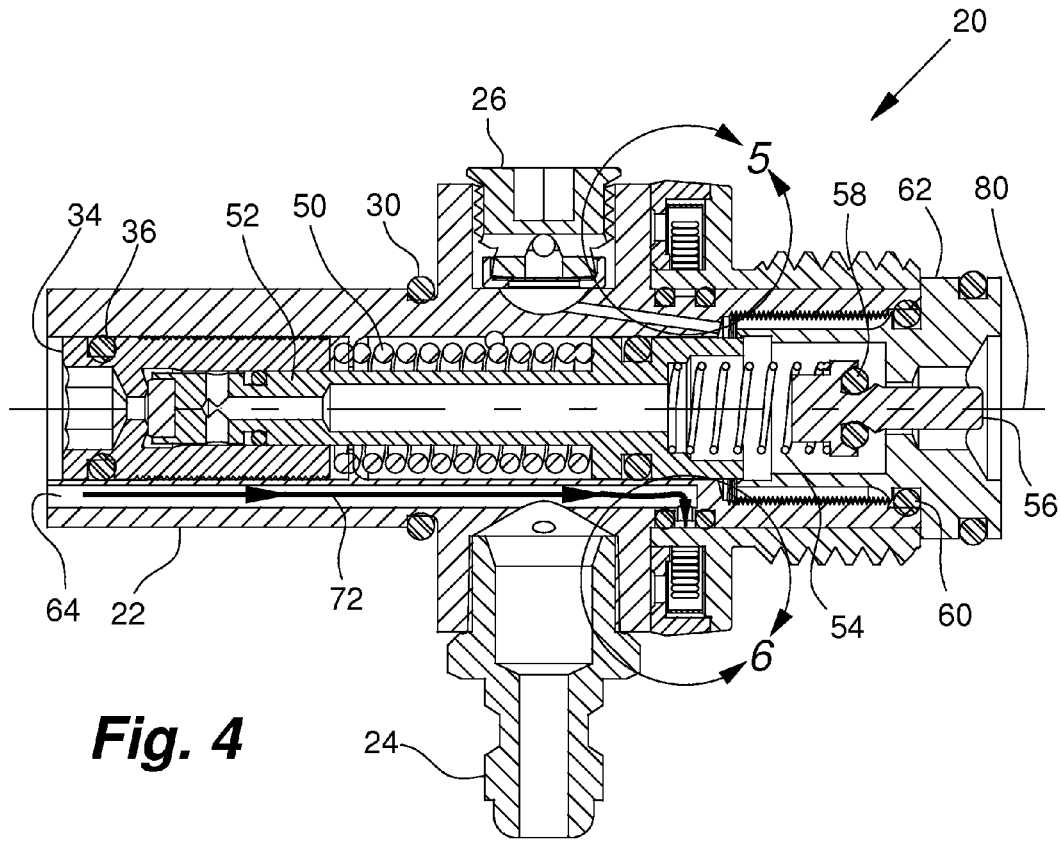
FIG. 4 is a diagrammatic cross-sectional view taken along line 4-4 in FIG. 3.
Figure 5:
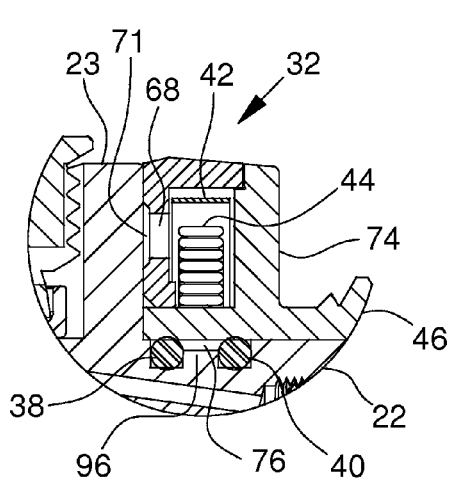
FIG. 5 is an enlarged broken diagrammatic view of section "5" in FIG. 4.
Figure 6:
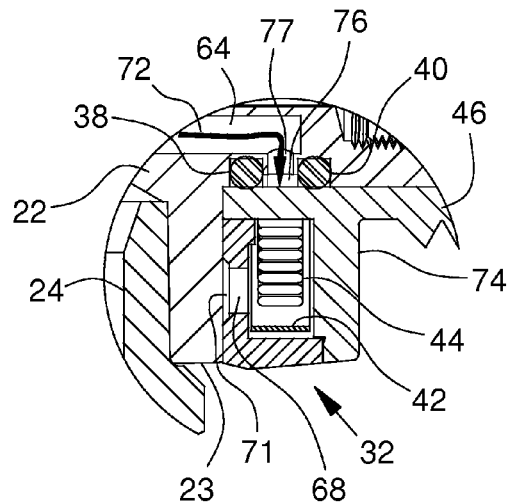
FIG. 6 is an enlarged broken diagrammatic view of section "6" in FIG. 4.

Referring to FIGS. 4-6, for example, particular embodiments comprise a first resilient seal element 38, a second resilient seal element 40, and an annular pressure channel 76 generally disposed axially therebetween. In such embodiments, the annular pressure channel 76 is typically in fluid communication between the pressurized fluid 72 and the fluid pressure receiving port 97.

In certain embodiments, the bourdon tube member 44 has an outer tube surface and the embodiment further comprises a first vent pathway (examples of which are illustrated at 165 and 206) and a first radially extending port (examples of which are illustrated at 77, 124, 160, 163, 188, and 192). The first vent pathway being in fluid communication between the outer tube surface and the ambient environment. The first radially extending port is typically integral with the portion 21 and adapted to be in fluid communication between the pressurized fluid 72 and the fluid pressure receiving port 97. Further embodiments may comprise a second radially extending port (examples of which are illustrated at 126 and 186) which are typically extrinsic to the portion 21 and adapted to be in fluid communication between the first radially extending port and the fluid pressure receiving port 97.

Figure 7:
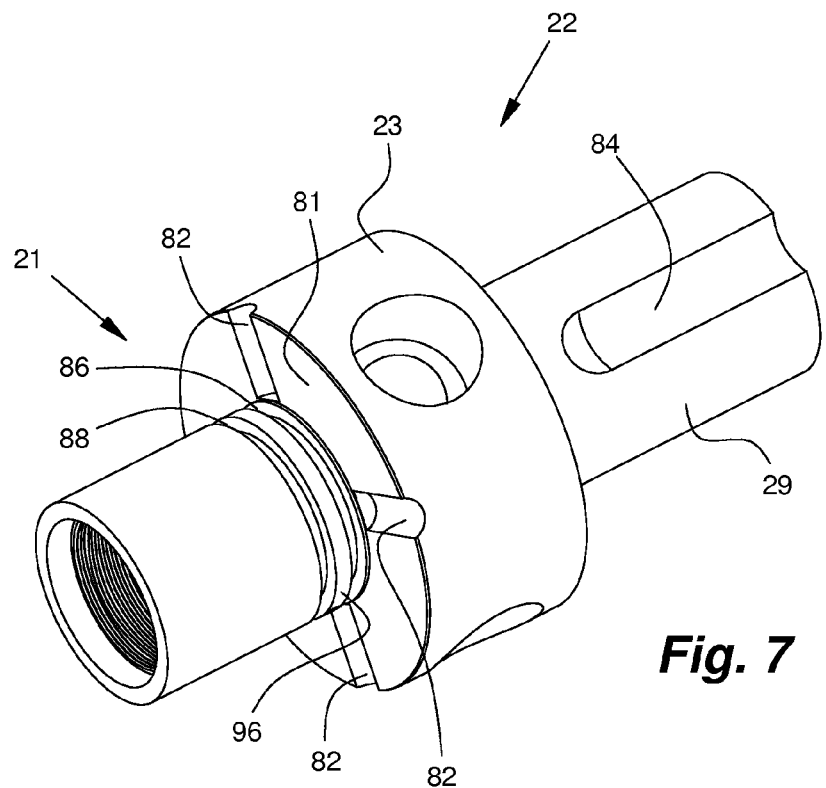
FIG. 7 is a diagrammatic perspective view of a regulator body that is adapted to be used with an embodiment of an annular bourdon tube gauge assembly.
Figure 8:
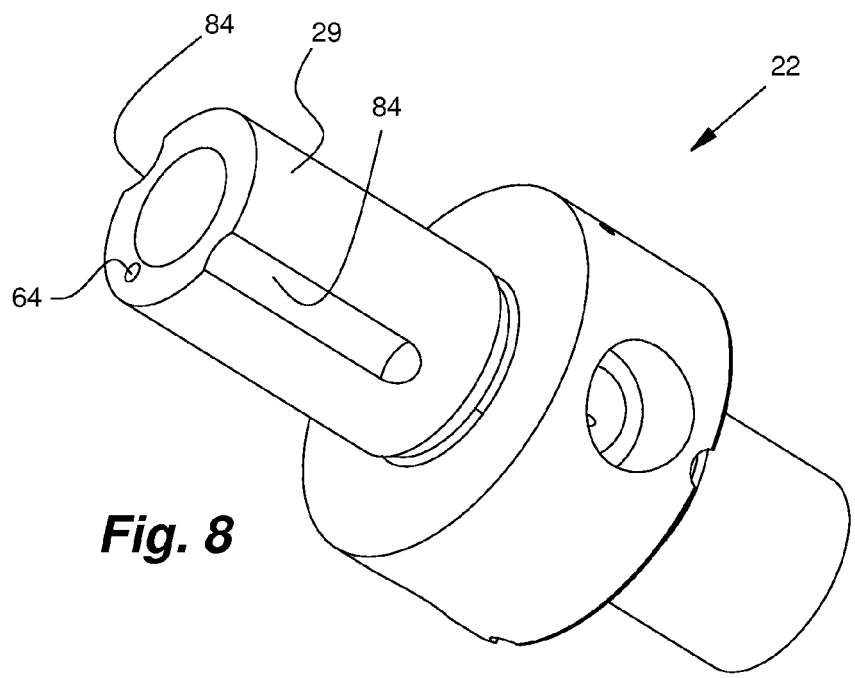
FIG. 8 is a further diagrammatic perspective view of the regulator body shown in FIG. 7.

Referring to FIGS. 7 and 9, in particular embodiments, the first flange element 23 has a proximal face 81 which includes one or more radially extending vent grooves 82. In such embodiments, the bourdon tube member 44 may have an outer tube surface and the window element 32 may have a radially extending wall 31. Referring to FIGS. 19-22, the radially extending wall 31 may include an annular groove 70 and one or more vent holes 68. The radially extending wall 31 may be generally adjacent to the proximal face 81 such that the combination of the annular groove 70 and the proximal face 81 forms an annular vent manifold 71 (see, for example, FIGS. 5 and 6), and the combination of the radially extending wall 31 and the radially extending vent grooves 82 form one or more radial vent channels 83 (see, for example, FIG. 2). In embodiments, the vent holes 68 are in fluid communication between the outer tube surface and the annular vent manifold 71. Also in embodiments, the radial vent channels 83 are in fluid communication between the annular vent manifold 71 and the ambient environment. In embodiments such as the one depicted at 20, the first vent pathway is defined by one or a combination of the vent holes 68, annular vent manifold 71 and radial vent channels 83.

Referring to FIG. 7, in embodiments, the portion 21 may further include a first annular seal groove 86, a second annular seal groove 88, and an intermediate portion 96 therebetween. Referring to FIG. 14, embodiments may further comprise a spool member 46 having an axial bore 41, a spool sleeve 45, and one or more anti-rotation studs 47. The axial bore 41 is typically large enough to receive the portion 21 therethrough. The second flange element 74 may be an integral part of the spool member 46. The spool sleeve 45 extends generally parallel of the axial bore 41 and is sized to be receivingly engaged by the bourdon tube member 44 at generally the radially inner end 98. The second flange element 74 extends generally radially outward from the spool sleeve 45. The anti-rotation studs 47 are adapted to engage a respective radially extending vent groove 82 so as to prevent the spool member 46 from rotating about the axial bore 41 relative to the portion 21.

Referring to FIGS. 4-6, embodiments such as the one depicted at 20 may further comprise a first resilient seal element 38 disposed within the first annular seal groove 86, and a second resilient seal element 40 disposed within the second annular seal groove 88 such that the first resilient seal element 38 and second resilient seal element 40, the intermediate portion 96 and the spool sleeve 45 cooperate to define the boundaries of an annular pressure channel 76. The annular pressure channel 76 is typically in fluid communication between the pressurized fluid 72 and the fluid pressure receiving port 97.

Figure 2:
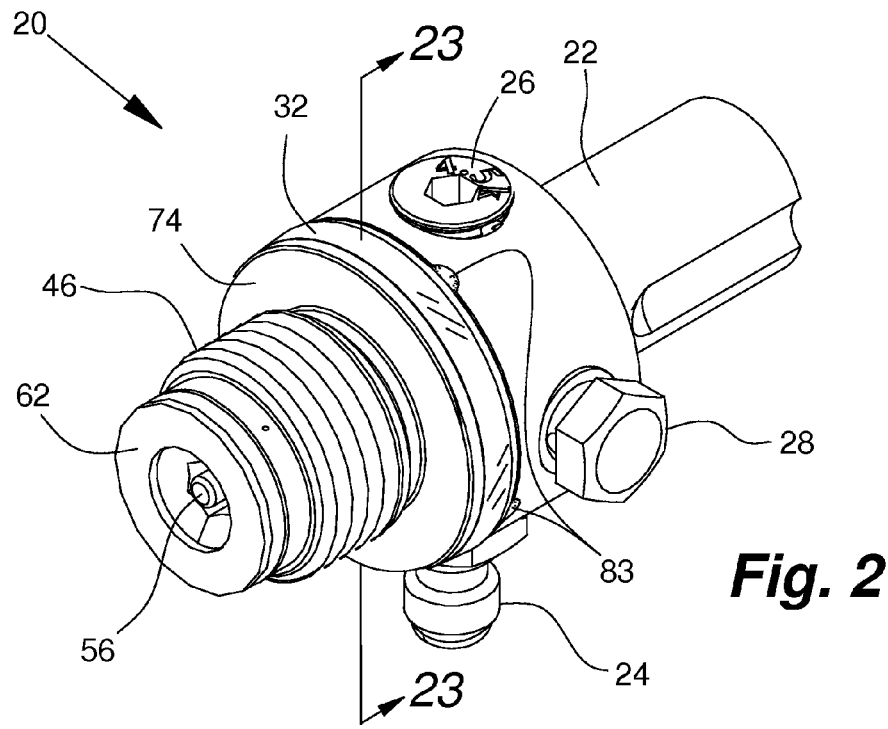
FIG. 2 is diagrammatic assembled perspective view of an embodiment of an annular bourdon tube gauge assembly shown in FIG. 1.

As illustrated for example in FIGS. 2 and 4, in particular embodiments, the first flange element 23, the second flange element 74 and the window element 32 each have outer diameters which are approximately equal. In further such embodiments, the portion 21 is approximately cylindrical and includes an outer barrel diameter, the outer diameters each being less than three times the size of the outer barrel diameter.

Figure 3:
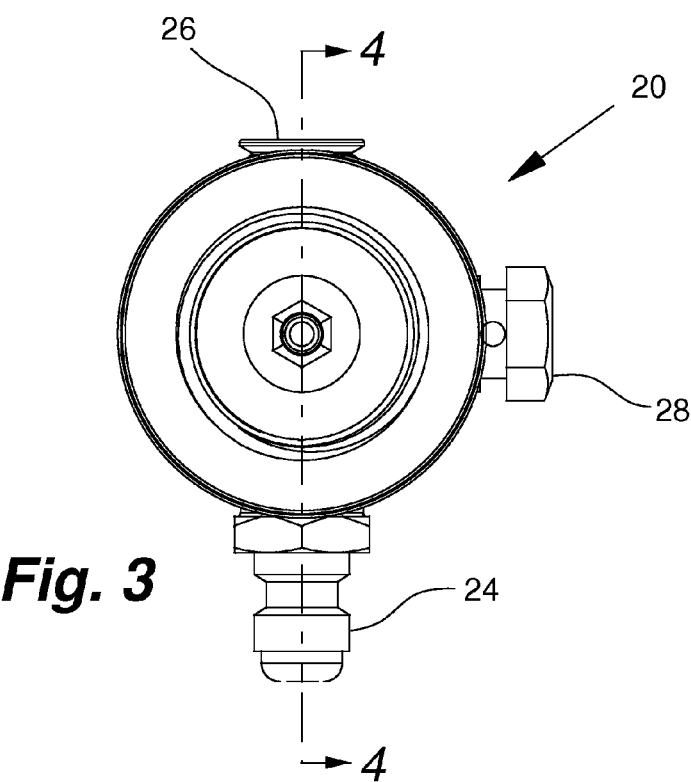
FIG. 3 is a diagrammatic front view of an embodiment of an annular bourdon tube gauge assembly shown in FIG. 2.

Some embodiments, such as the one illustrated in FIGS. 2-4, may comprise a fluid pressure regulator including a body member 22 having a portion 21 that has a generally circular exterior. In such an embodiment, the body member 22 is adapted to confining a pressurized fluid 72. Such an embodiment is adapted to be mounted generally externally circumferentially of the portion 21.

Referring to FIG. 27, a further embodiment of an annular bourdon tube gauge assembly is illustrated generally at 103, comprising a portion 104 of a body member in the form of a fluid pressure retaining conduit, the portion 104 having a main axis 128 and a portion outer radius 134. The bourdon tube member 118 has an tube outer radius 130 and a tube inner radius 132. With respect to this embodiment 103, FIG. 27 diagrammatically illustrates a first radially extending port 124, a first flange element 106, a spool member 108, a first resilient seal member 110, a second resilient seal member 112, a second flange element 114, an annular pressure channel 116, a window element 120, a pressure level indicator 122 and a second radially extending port 126.

Referring to FIG. 28, a further embodiment of an annular bourdon tube gauge assembly is illustrated generally at 170, mounted generally externally circumferentially of a portion 158 of a pressure regulator adjacent a tank end of the regulator. With respect to this embodiment 170, FIG. 28 diagrammatically illustrates a first flange element 156, a main axis 159, a first radially extending port 160, an axially extending pressure pathway 161, a second flange element 162, an o-ring seal 164, a first vent pathway 165, a bourdon tube member 118 with a tube outer radius 166 and a tube inner radius 168, a window element 120 and a pressure level indicator 122. In embodiment 170, the pressurized fluid travels through axially extending pressure pathway 161, possibly directly from the adjacent tank.

Referring to FIG. 29, a further embodiment is illustrated generally at 217. Embodiment 217 is similar to embodiment 103, however, the first radially extending port 163 communicates directly with the main bore of the pressure regulator.

Figure 30:
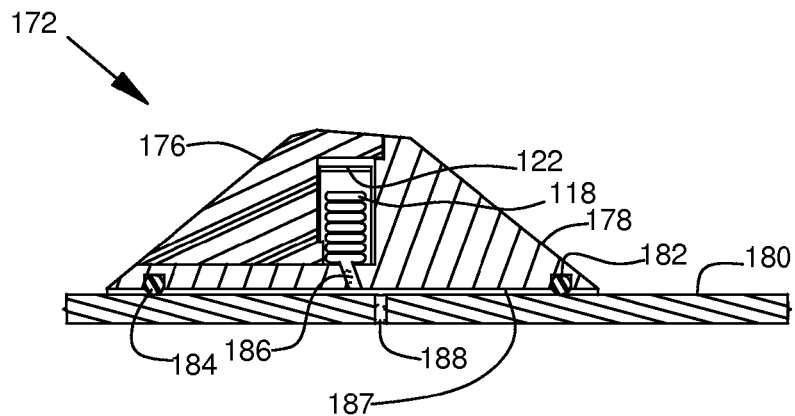
FIG. 30 is a diagrammatic partial cross-sectional side view of an embodiment of an annular bourdon tube gauge assembly mounted generally externally circumferentially of a portion of a body member in the form of a fluid pressure containing conduit wherein the pressure gauge assembly is slidably and sealingly received on the conduit in operative association with a port in the conduit, and the assembly is configured to protect the gauge from damage.

Referring to FIG. 30, a further embodiment of an annular bourdon tube gauge assembly is illustrated generally at 172, mounted on a portion 180 of a body member in the form of a fluid pressure containing conduit. The embodiment 172 is shown slidably and sealingly received on the conduit in operative association with a first radially extending port 188. With respect to this embodiment 172, FIG. 30 diagrammatically illustrates a first resilient seal element 182, a second resilient seal element 184, an annular pressure channel 187, a first flange element 178, a second radially extending port 186 and a second flange element 176. In this embodiment 172, the second flange element 176 is also the window element, and the embodiment is configured to be further protected from damage, in part by way of its angled surfaces.

Figure 31:
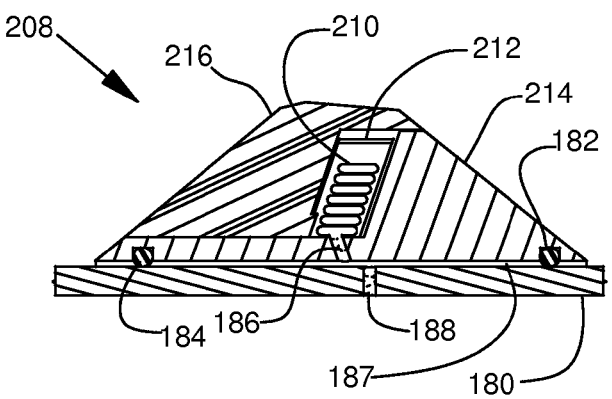
FIG. 31 is a diagrammatic partial cross-sectional side view of an embodiment of an annular bourdon tube gauge assembly mounted generally externally circumferentially of a portion of a body member in the form of a fluid pressure containing conduit wherein the pressure gauge assembly is slidably and sealingly received on the conduit in direct fluid pressure communication with a port in the conduit, and the assembly is configured to protect the gauge from damage.

Referring to FIG. 31, a further embodiment of an annular bourdon tube gauge assembly is illustrated generally at 208. Embodiment 208 is similar to embodiment 172, but the bourdon tube member 210 is configured conically, and the first flange element 214, the second flange member 216 and pressure level indicator 212 are adapted accordingly. The second flange element 216 is also the window element in this embodiment 208.

Figure 32:
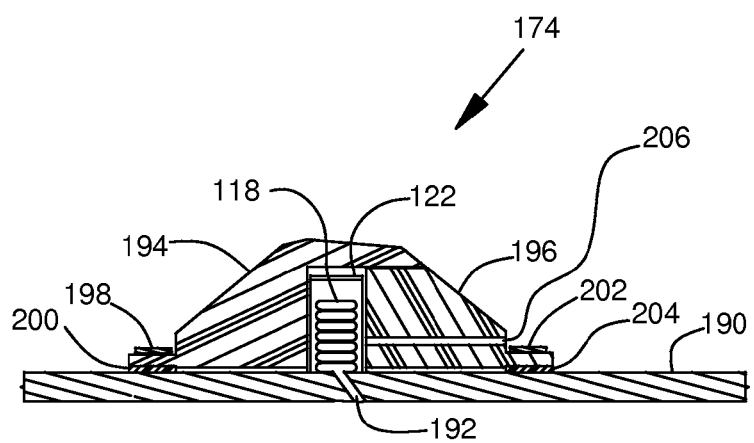
FIG. 32 is a diagrammatic partial cross-sectional side view of an embodiment of an annular bourdon tube gauge assembly mounted generally externally circumferentially of a portion of a body member in the form of a fluid pressure containing conduit wherein the pressure gauge assembly is slidably and sealingly received on the conduit in operative association with a port in the conduit, and the assembly is configured to protect the gauge from damage.

Referring to FIG. 32, a further embodiment of an annular bourdon tube gauge assembly is illustrated generally at 174, mounted on a portion 190 of a body member in the form of a fluid pressure containing conduit. The embodiment 174 is shown slidably and sealingly received on the conduit in operative association with a first radially extending port 192. With respect to this embodiment 174, FIG. 32 diagrammatically illustrates a first resilient seal element 204, a second resilient seal element 200, a first flange element 196, a first vent pathway 206, a second flange element 194 and mounting straps 198 and 202. In this embodiment 174, the second flange element 194 is also the window element, and the first flange element 196 may be made of a polymer.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An annular bourdon tube gauge assembly comprising:
an adaptation allowing said annular bourdon tube gauge assembly to be mounted generally externally circumferentially of a portion of a body member that is adapted to confining a pressurized fluid;
a first flange element and a second flange element, said first and second flange elements adapted to receive said portion and to extend approximately radially outwardly therefrom;
a bourdon tube member having a generally spiral shape, said generally spiral shape having a generally circular central opening therein, said generally circular central opening being adapted to receive said portion therethrough, said bourdon tube member further having a radially inner end, a radially outer end and a fluid pressure receiving port, said radially inner end adapted to being generally spatially fixed with respect to said portion, said radially outer end being generally free to move generally circumferentially of said bourdon tube member responsive to changes in said fluid pressure, said fluid pressure receiving port adapted to being placed in fluid communication with said pressurized fluid, said bourdon tube member being generally axially disposed between said first and second flange elements; and
a pressure level indicator mounted to and moveable with said radially outer end, said pressure level indicator disposed between said first and second flange elements and viewable from a position located approximately laterally outward of said first and second flange elements.

2. An annular bourdon tube gauge assembly as defined in claim 1 in which said portion forms part of the housing of a fluid pressure regulator system.

3. An annular bourdon tube gauge assembly as defined in claim 1 in which said first flange element is integral with said body member.

4. An annular bourdon tube gauge assembly as defined in claim 1 further comprising a window element, said window element having a display portion being substantially transparent and disposed between said pressure level indicator and said position, and said pressure level indicator including a gauge face having pressure indicating markings thereon and extending in a generally circumferential direction between said display portion and said bourdon tube member.

5. An annular bourdon tube gauge assembly as defined in claim 4 further comprising a first resilient seal element, a second resilient seal element, and an annular pressure channel generally disposed axially therebetween, said annular pressure channel being in fluid communication between said pressurized fluid and said fluid pressure receiving port.

6. An annular bourdon tube gauge assembly as defined in claim 4 in which said pressure level indicator is generally cylindrical and divisible into three display sections, said display sections each being defined by a separate 120-degree arc of said pressure level indicator, each of said display sections displaying identical pressure level information.

7. An annular bourdon tube gauge assembly as defined in claim 4 in which:
said bourdon tube member has an outer tube surface; and
said annular bourdon tube gauge assembly further comprises a first vent pathway and a first radially extending port, said first vent pathway being in fluid communication between said outer tube surface and the ambient environment, said first radially extending port being integral with said portion and adapted to be in fluid communication between said pressurized fluid and said fluid pressure receiving port.

8. An annular bourdon tube gauge assembly as defined in claim 7 in which said annular bourdon tube gauge assembly further comprises a second radially extending port, said second radially extending port being extrinsic to said portion and adapted to be in fluid communication between said first radially extending port and said fluid pressure receiving port.

9. An annular bourdon tube gauge assembly as defined in claim 4 in which:
said first flange element has a proximal face, said proximal face including a radially extending vent groove;
said bourdon tube member has an outer tube surface; and
said window element has a radially extending wall, said radially extending wall including an annular groove and a vent hole, said radially extending wall being generally adjacent said proximal face such that the combination of said annular groove and said proximal face forms an annular vent manifold, and the combination of said radially extending wall and said radially extending vent groove form a radial vent channel, said vent hole being in fluid communication between said outer tube surface and said annular vent manifold, said radial vent channel being in fluid communication between said annular vent manifold and the ambient environment.

10. An annular bourdon tube gauge assembly as defined in claim 9 in which:
said portion further includes a first annular seal groove, a second annular seal groove, and an intermediate portion therebetween;
said annular bourdon tube gauge further comprises a spool member, said spool member having an axial bore, a spool sleeve, and an anti-rotation stud, said second flange element being an integral part of said spool member, said axial bore being large enough to receive said portion therethrough, said spool sleeve extending generally parallel of said axial bore and sized to be receivingly engaged by said bourdon tube member at generally said radially inner end, said second flange element extending generally radially outward from said spool sleeve, said anti-rotation stud being adapted to engage said radially extending vent groove so as to prevent said spool member from rotating about said axial bore relative to said portion; and said annular bourdon tube gauge assembly further comprises a first resilient seal element disposed within said first annular seal groove and a second resilient seal element disposed within said second annular seal groove such that said first and second resilient seal elements, said intermediate portion and said spool sleeve cooperate to define the boundaries of an annular pressure channel, said annular pressure channel being in fluid communication between said pressurized fluid and said fluid pressure receiving port.

11. An annular bourdon tube gauge assembly as defined in claim 4 in which:
said first flange element has a proximal face, said proximal face including a plurality of radially extending vent grooves;
said bourdon tube member has an outer tube surface; and
said window element has a radially extending wall, said radially extending wall includes an annular groove and a plurality of radially distributed vent holes, said radially extending wall being generally adjacent said proximal face such that the combination of said annular groove and said proximal face form an annular vent manifold, and the combination of said radially extending wall and said radially extending vent grooves form respective radial vent channels, said radially distributed vent holes each being in fluid communication between said outer tube surface and said annular vent manifold, said radial vent channels each being in fluid communication between said annular vent manifold and the ambient environment.

12. An annular bourdon tube gauge assembly as defined in claim 4 in which said gauge face is substantially cylindrical and substantially visible through said display portion in a radial direction.

13. An annular bourdon tube gauge assembly as defined in claim 4 in which said first and second flange elements and said window element each have outer diameters, said outer diameters being approximately equal.

14. An annular bourdon tube gauge assembly as defined in claim 13 in which said portion is approximately cylindrical and includes an outer barrel diameter, said outer diameters each being less than three times the size of said outer barrel diameter.

15. An annular bourdon tube gauge assembly comprising:
an adaptation allowing said annular bourdon tube gauge assembly to be mounted generally externally circumferentially of a portion of a body member that is adapted to confining a pressurized fluid;
a first flange element and a second flange element, said first and second flange elements adapted to engage said portion and to extend approximately radially outwardly therefrom;
a bourdon tube member having a generally spiral shape and an outer tube surface, said generally spiral shape having a generally circular central opening therein, said generally circular central opening being adapted to receive said portion therethrough, said bourdon tube member further having a radially inner end, a radially outer end, and a fluid pressure receiving port, said radially inner end adapted to being generally spatially fixed with respect to said portion, said radially outer end being generally free to move generally circumferentially of said bourdon tube member responsive to changes in said fluid pressure, said fluid pressure receiving port adapted to being placed in fluid communication with said pressurized fluid, said bourdon tube member being generally axially disposed between said first and second flange elements;

a pressure level indicator mounted to and moveable with said radially outer end, said pressure level indicator disposed between said first and second flange elements and viewable from a position located approximately laterally outward of said first and second flange elements;

a window element, said window element having a display portion being substantially transparent and disposed between said pressure level indicator and said position; and a spool member having an axial bore and a spool sleeve, said second flange element being an integral part of said spool member, said axial bore being large enough to receive said portion therethrough, said spool sleeve extending generally parallel of said axial bore and sized to be receivingly engaged by said bourdon tube member at generally said radially inner end, said second flange element extending generally radially outward from said spool sleeve.

16. An annular bourdon tube gauge assembly as defined in claim 15 in which said portion forms part of the housing of a fluid pressure regulator system.

17. An annular bourdon tube gauge assembly as defined in claim 15 in which:

said portion further includes a first annular seal groove, a second annular seal groove, and an intermediate portion therebetween; and said annular bourdon tube gauge assembly further comprises a first resilient seal element disposed within said first annular seal groove and a second resilient seal element disposed within said second annular seal groove such that said first and second resilient seal elements, said intermediate portion and said spool sleeve cooperate to define the boundaries of an annular pressure channel, said annular pressure channel being in fluid communication between said pressurized fluid and said fluid pressure receiving port.

18. An annular bourdon tube gauge assembly as defined in claim 15 in which:

said first flange element has a proximal face, said proximal face including one or more radially extending vent grooves;

said bourdon tube member has an outer tube surface; and said window element has a radially extending wall, said radially extending wall includes an annular groove and one or more radially distributed vent holes, said radially extending wall being generally adjacent said proximal face such that the combination of said annular groove and said proximal face form an annular vent manifold, and the combination of said radially extending wall and said one or more radially extending vent grooves form one or more respective radial vent channels, said one or more radially distributed vent holes each being in fluid communication between said outer tube surface and said annular vent manifold, said one or more radial vent channels each being in fluid communication between said annular vent manifold and the ambient environment.

19. An annular bourdon tube gauge assembly as defined in claim 18 in which said spool member has an anti-rotation stud, said anti-rotation stud being adapted to engage one of said one or more radially extending vent grooves so as to prevent said spool member from rotating about said axial bore relative to said portion.

\* \* \* \* \*